May 11, 1943.  W. W. SLOANE  2,318,808
FEEDER HEAD FOR SHAKER CONVEYERS
Filed Sept. 29, 1941  4 Sheets-Sheet 4
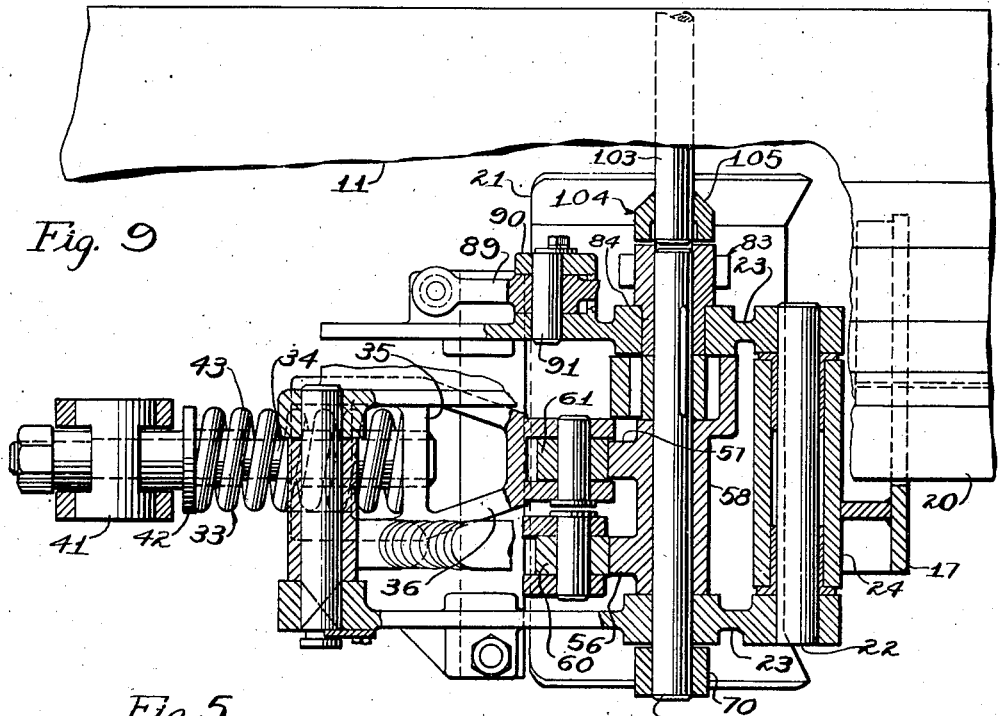
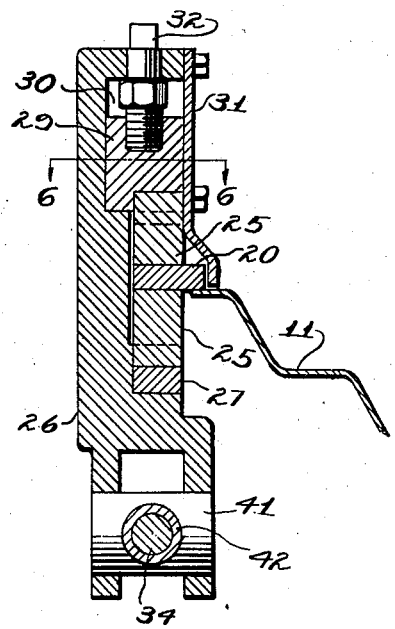
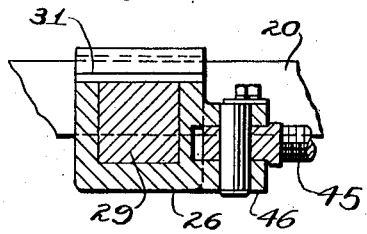
INVENTOR.
William W. Sloane
BY Clarence F. Poole
ATTY.

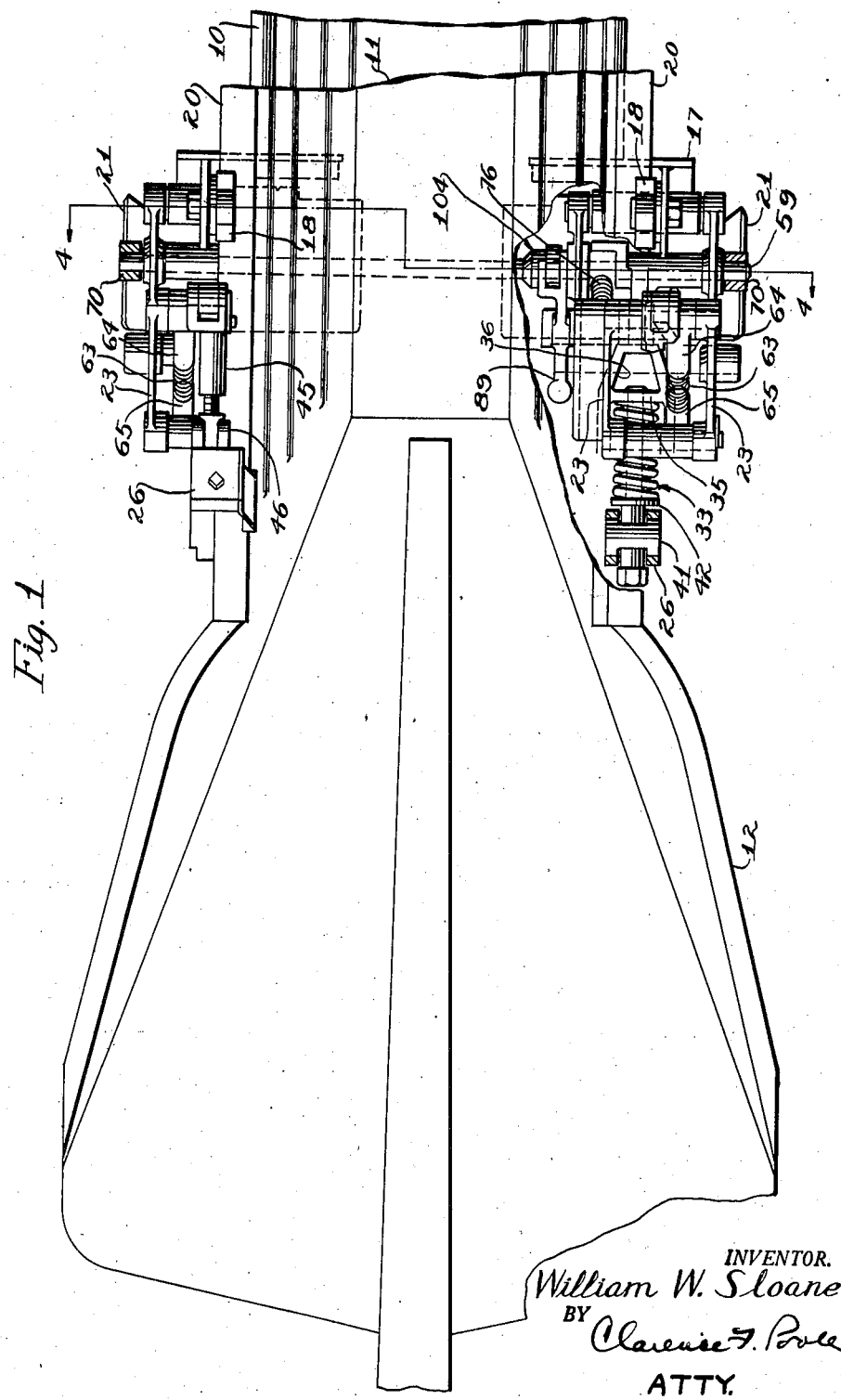

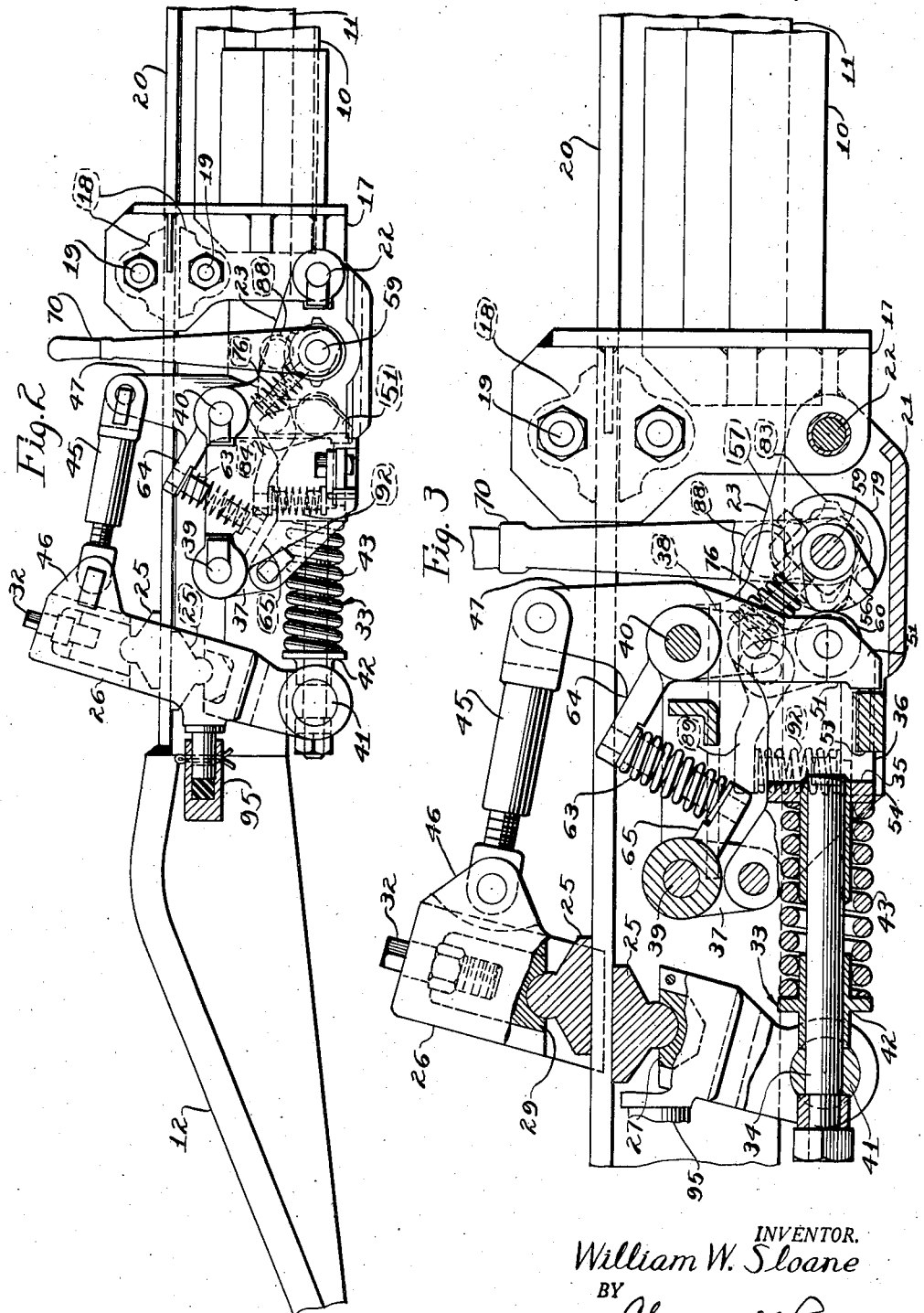

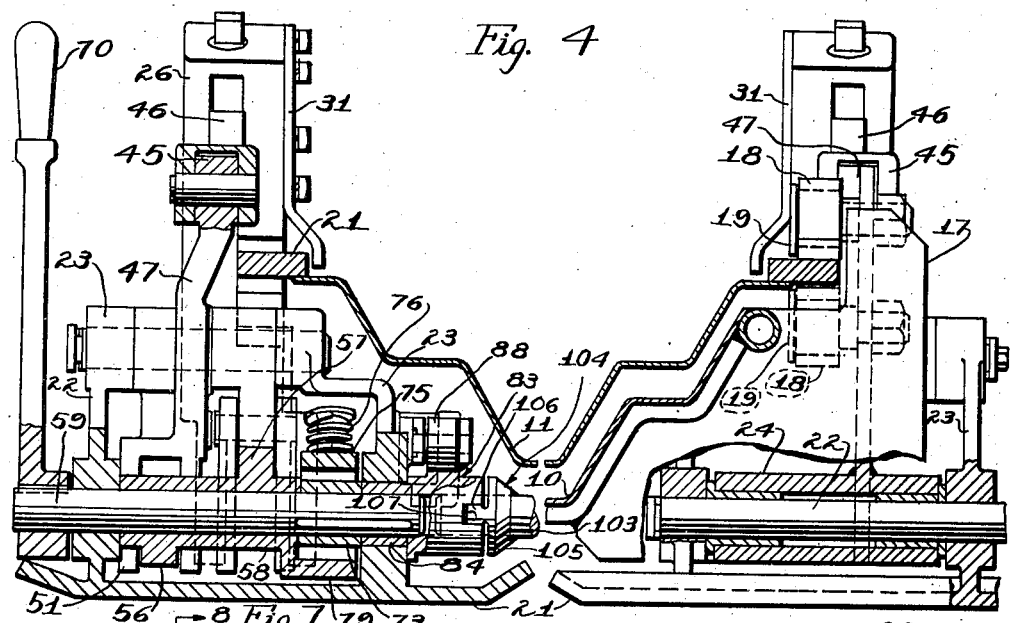
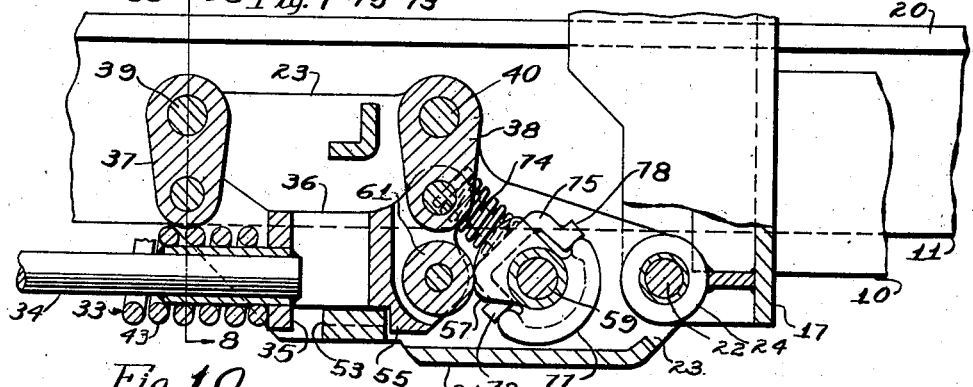
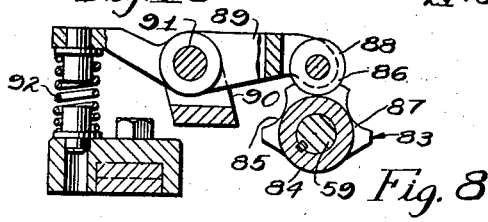
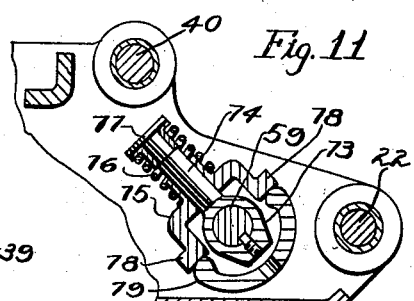
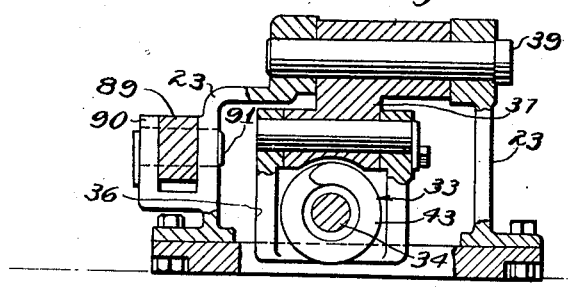
INVENTOR.
William W. Sloane
BY Clarence F. Poole
ATTY.

Patented May 11, 1943

2,318,808

UNITED STATES PATENT OFFICE 2,318,808

FEEDER HEAD FOR SHAKER CONVEYERS

William W. Sloane, Chicago, Ill., assignor to Goodman Manufacturing Company, Chicago, Ill., a corporation of Illinois Application September 29, 1941, Serial No. 412,749

12 Claims. (Cl. 198—220)

This invention relates to improvements in feeder heads for shaker conveyers of the type utilized for extending an extensible trough section of a shaker conveyer into a mined coal face to pick up and transport the loose coal away from the working face.

The principal objects of my invention are to provide a novel and simplified form of automatic feeding device of the friction grip type adapted to automatically extend or retract an extensible trough section of a shaker conveyer solely by reciprocable movement of the conveyer in a more efficient and expeditious manner than formerly and including a novel arrangement of gripping devices and means for controlling the moving of the gripping devices to an engaged or disengaged position during certain strokes of the conveyer.

A more specific object of my invention is to provide a new and improved feeding device of the class described, together with a novel supporting arrangement for the gripping devices on opposite sides of the conveyer so as to eliminate binding between the extensible trough section and these gripping devices, and to equalize the gripping action on each side of the extensible trough section.

Other objects of my invention will appear from time to time as the following specification proceeds and with reference to the accompanying drawings wherein:

Figure 1 is a plan view of the loading end of a shaker conveyer trough line having a feeding device constructed in accordance with my invention associated therewith, with certain parts broken away and certain other parts shown in horizontal section;

Figure 2 is an enlarged view in side elevation of the device shown in Figure 1, with certain parts thereof shown in section;

Figure 3 is an enlarged fragmentary side elevational view of the device shown in Figure 1, with certain parts broken away and certain other parts shown in longitudinal section;

Figure 4 is a transverse sectional view taken substantially along line 4—4 of Figure 1;

Figure 5 is an enlarged transverse sectional view taken through one of the carrier members in order to show certain details of construction thereof;

Figure 6 is an enlarged fragmentary sectional view taken substantially along lines 6—6 of Figure 5;

Figure 7 is an enlarged detail view showing certain details of the means for controlling extension of the extensible trough section;

Figure 8 is an enlarged partial fragmentary transverse sectional view taken substantially along line 8—8 of Figure 7;

Figure 9 is an enlarged fragmentary plan view with parts broken away and certain other parts shown in horizontal section, in order to illustrate certain details of the control means for the carrier members;

Figure 10 is a partial fragmentary longitudinal sectional view showing certain details of the operating connection for operating the control means for the feeding mechanism; and Figure 11 is a partial fragmentary longitudinal sectional view showing certain details of the index for the control means for the feeding mechanism.

In the embodiment of my invention illustrated in the drawings, the main elements thereof include a reciprocating trough section 10 connected to the forward end of the shaker conveyer trough line and reciprocably driven thereby in a well known manner (not shown). An extensible trough section 11 having a flared gathering shovel 12 on its forward end is mounted for telescopic extension or retraction with respect to said reciprocating trough section.

The extensible trough section 11 is slidably supported on the ground at its forward end of the forward end of the shovel 12, and may be supported above the ground at its rear end on a suitable supporting shoe in a manner similar to that illustrated in a prior patent to Ernst R. Bergmann, Re. 21,027, and no part of my present invention so not herein shown or described.

The reciprocating trough section 10 is provided with a forwardly projecting frame member 17 extending across its bottom and upwardly along opposite sides thereof. Two vertically spaced bearing blocks 18, 18 are pivotally mounted on each side wall of said frame member, in advance of the forward end of said reciprocating trough section, on pivotal pins 19, 19. Said bearing blocks are adapted to extend above and below bearing plates 20, 20, projecting laterally from and extending along opposite sides of said extensible trough section to support the forward end of said reciprocating trough section for movement along said extensible trough section.

The means for extending or retracting the extensible trough section 11 relative to the reciprocating trough section 10 includes a pair of laterally spaced connecting frames or shoes 21, 21.

Said shoes project forwardly from and are pivotally connected to the lower forward end of the frame member 17 on laterally spaced transversely extending pivotal pins 22, 22. Said pivotal pins are mounted at their ends in parallel spaced upright side walls 23, 23 of said shoes, and are journaled intermediate their ends in a bearing boss 24 at the lower forward end of said frame member 17. Said shoes each serve as a means for connecting the feeding mechanisms to the reciprocating trough section 10 and are normally out of engagement with the ground, but serve to prevent rocks or irregularities in the ground from injuring the operating and controlling parts of the feeding mechanism. Since said shoes are independently mounted on the forward end of the reciprocating trough section, the feeding mechanism may more readily grip the extensible trough section when operating over an irregular mine bottom, and binding between said gripping devices and trough section is minimized, especially where said trough section is twisted due to irregularities in the ground or due to heavy lumps of material falling on one side thereof.

The feeding mechanism includes two pairs of friction grip blocks 25, 25, each one of which pairs is mounted in a carrier member 26 inclined in a rearward direction, from the lower to the upper side of said extensible trough section. The arrangement and construction of each of said carrier members and their connection to the shoes 21, 21 and the operating means therefor is the same, so one of said carrier members only and the operating means therefor will herein be described in detail.

The lower friction grip block 25 has pivotal engagement with a block 27, mounted in said carrier member beneath the bearing plate 20 (see Figures 3 and 5). The upper friction grip block 25 has pivotal engagement with a socket formed in the lower end of a block 29, adjustably mounted in a recessed portion 30 of said carrier member, and held therein by means of a retaining plate 31 (see Figure 5). An adjusting screw 32, rotatably mounted in an upper end wall of said carrier member, is threaded in said block and serves as a means for adjusting the clearance between said grip blocks and the bearing plate 20.

The connection from the lower end of said carrier member to the shoe 21 includes a yieldable link generally indicated by reference character 33. Said link includes a rod 34, secured to a forward upright end wall 35 of a yoke-shaped member 36. Said yoke-shaped member is mounted between the side walls 23, 23 of said shoe, for relative movement with respect thereto on the lower ends of two longitudinally spaced links 37 and 38, which are pivotally mounted between the side walls 23, 23, on transverse shafts 39 and 40, respectively.

The opposite end of the rod 34 extends through a pivotal pin 41 and is slidably mounted with respect thereto. Said pin is mounted in a lower end of said carrier member, for pivotal movement with respect thereto about a transverse axis. A flanged sleeve 42, slidably mounted on said rod, abuts the rear end of said pivotal pin. A compression spring 43 encircles said rod and is interposed between the flanged portion of said sleeve and the forward end wall 35 of the yoke 36. Said spring is of sufficient strength that said yieldable link will normally be a solid member but will yield upon the engagement of an obstruction by the shovel 12, upon the forward strokes of the conveyer, to permit the grip blocks 25, 25 to be disengaged from the bearing plate 20 in a manner usual with feeding devices of this type.

The yoke 36 is provided with a depending shouldered portion 55 which is adapted to be engaged with a stop 53 extending transversely across the shoe 21 (see Figure 7). When said shouldered portion of said yoke is held in engagement with said stop, the yieldable link 33 will exert a forward thrusting action on the lower end of said carrier member during the forward strokes of the conveyer, to engage the grip blocks 25, 25 with the bearing plate 20, and will exert a pulling force on said end of said carrier member upon the return strokes of the conveyer, to move said carrier member in a direction to release said grip blocks from said bearing plate.

The upper end of the carrier member 26 is connected with the shoe 21 by means of a link 45. Said link is herein shown as being adjustable in length and is pivotally connected at its forward end to an ear 46, projecting rearwardly from said carrier member. The opposite end of said link is pivotally connected to the upper end of a rocking member 47, which is pivotally mounted on the shaft 40. The rocking member 47 has a depending arm 51 adapted to be engaged with the stop 53. When said depending arm is held in engagement with said stop, said link will exert a pulling force on the upper end of said carrier member during the return strokes of the conveyer to cause the friction grip blocks 25, 25 to grip the bearing plate 20, and will exert a pushing force on the upper end of said carrier member, upon the forward strokes of the conveyer, to release said grip blocks from said bearing plate.

Referring now in particular to the means for selectively holding the links 33 and 45 in fixed relation with respect to the shoe 21 to move therewith during reciprocation of the conveyer, or to permit either one of said links to be relatively movable with respect to said shoe, a pair of cams 56 and 57 is herein shown as being formed integrally with a common sleeve 58, which is freely mounted on a transverse shaft 59, journalled in opposite side walls 23, 23 of the shoe 21 (see Figures 3, 4 and 9).

The cam 56 is adapted to engage a roller 60 disposed adajacent the lower end of the depending arm 51, of the rocking member 47, and to move and hold the lower forward end of said lever arm in engagement with the stop 53.

The cam 57 is adapted to engage a roller 61 mounted between the sides of the yoke 36 on a pivotal pin 62 to engage the shouldered portion 55 of the link 33 with the stop 53, and to hold said shouldered portion of said lever arm in engagement with said stop.

Means are provided to urge the carrier member 26 into the proper position of inclination with respect to the bearing plate 20, so the grip blocks 25, 25 will be in position to engage the bearing plate 20 at the beginning of the forward or return strokes of the conveyer, depending upon whether the extensible trough section is being extended or retracted. Said means, as herein shown, includes a compression spring 63 interposed between an arm 64 projecting forwardly from the rocking member 47 in an angularly upwardly direction from the pivotal axis thereof, and an arm 65, which projects rearwardly from the pivotal axis of the link 37 in an angularly downwardly direction from the pivotal axis thereof, and which is herein shown as being formed integral with said link (see Figure 3). The strength of said compression spring is such that it will exert a force against the lever arms 64 and 65 in a direction to move the depending arm 51 against the stop 53 and the shoulder 55 against the same stop, to hold the grip blocks 25, 25 in a position to grip the bearing plates 20, 20 at the beginning and ends of the forward and return strokes of the conveyer, depending upon the direction of feeding movement of said extensible trough section, but said spring is not sufficiently strong to cause any gripping action of the grip blocks 25, 25.

The cams 56 and 57 are operated by means of a hand lever 70, keyed to the outer end of the transverse shaft 59. The operating connection from said shaft to said cams is clearly shown in Figure 11 and includes a member 73 keyed to the shaft 59. Said member has a pin 74 projecting radially therefrom and herein shown as being formed integral therewith. An engaging member 75 is slidably mounted on said pin, for movement towards and from the shaft 59, and is urged in a direction towards said shaft by means of a compression spring 76, interposed between the outer side of said engaging member and a retaining head 77 on the outer end of said pin. Said engaging member is provided with a pair of spaced apart engaging ends 78, 78 which are adapted to engage opposite ends of a projecting portion 79 of the sleeve 58. Said projecting portion extends beyond the end of said sleeve and is of a substantially semi-circular formation, extending beneath and upwardly along opposite sides of the member 73.

Thus, upon operation of the hand lever 70, the engaging member 75 yieldably engaged with the projecting portion 79 of the sleeve 58 by means of the compression spring 76, will turn said sleeve and the cams 56 and 57 with the shaft 59, to position said cams in an engaging or disengaged position with respect to their respective rollers. Since turning of said sleeve and cams is effected through the spring 76, any sudden shocks imparted to said cams by the links 33 or 45 at the beginning or ends of the strokes of the conveyer will be taken up by the compression spring 76.

An indexing means is provided to insure that the cams 56 and 57 are in a proper operating position, and to hold said cams in such a position (see Figure 10). As herein shown, said indexing means includes a star wheel 83, herein shown as being formed integrally with a sleeve 84, keyed adjacent the outer end of said shaft and journaled in a side wall 23 of the shoe 21. Said star wheel is provided with three indentations 85, 86 and 87, adapted to be engaged by a roller 88 on the end of an indexing lever 89. Said indexing lever is pivotally mounted intermediate its ends between a forked bracket portion 90 of the side wall 23 on a transverse pivotal pin 91 (see Figures 7, 8 and 10). A compression spring 92 engages the end of said indexing lever opposite from said roller and urges said roller into engagement with any one of the notches 85, 86 or 87.

When the roller 88 is in engagement with the center indentation 86 of said star wheel, the operating handle 70 will be in a vertical position and the two cams 56 and 57 will be held in engagement with the rollers 60 and 61, respectively, to hold the links 45 and 33 from relative movement with respect to the shoe 21 in the direction of movement of the conveyer, and to cause the grip blocks 25, 25 to grip the bearing plates 20, 20 during the forward and return strokes of the conveyer. This will cause reciprocable movement of the extensible trough section with the reciprocating trough section.

When the roller 88 is in engagement with the indentation 85, the operating handle 70 will be in a rearwardly inclined position and the cam 58 will be held in engagement with the roller 60, to hold the depending lower end 51 of the rocking arm 47 against the stop 53. At the same time the cam 57 will move away from the roller 61, to permit relative movement of the yieldable link 33 with respect to the shoe 21. This will cause the link 45 to move the carrier member 26 in a direction to grip the blocks 25, 25 with the bearing plate 20 upon the return strokes of the conveyer, and in a direction to release said grip blocks from said bearing plate upon the forward strokes of the conveyer, to cause retraction of the extensible trough section.

When the roller 88 is in engagement with the indentation 87, the handle 70 will be in a forwardly inclined position and the cam 57 will engage the roller 61 and hold the shouldered portion 55 of the link 33 in engagement with the stop 53, to hold said yieldable link from movement with respect to the shoe 21. At the same time, the cam 56 will move away from the roller 60. This will permit relative movement of the link 49 with respect to the shoe 21 and will cause the yieldable link 33 to engage the grip blocks 25, 25 with the bearing plate 20 upon the forward strokes of the conveyer, and to release said grip blocks from said bearing plates upon the return strokes of the conveyer, to cause extension of said extensible trough section.

A resilient stopping member 95 projects forwardly from the carrier member 26, immediately below the bearing plate 20. When the extensible trough section moves to an extreme retracted position, said stop is engaged by the shovel 12 upon the return strokes of the conveyer. This will compress the spring 43 of the yieldable link 33 and will move the carrier member 26 against said spring about its axis of connection to the link 45, to a position which will release the grip blocks 25, 25 from the bearing plate 20.

While the feeding mechanism on each side of the conveyer is substantially the same, the star wheel 83 and indexing lever 89 are not present on the side of the conveyer, which in Figure 1 is shown as being its right hand side. The cams 56 and 57 on the right hand side of the conveyer are mounted on a transverse shaft 103. Said shaft is similar to the shaft 59, and has said cams mounted thereon, and operates said cams in the same manner as the shaft 59, but extends inwardly beneath the extensible trough section 11 to a point adjacent the shaft 59, in substantially coaxial alignment therewith. A coupling 104 is provided to connect said shafts to operate together and to permit a certain amount of movement of said shafts with respect to each other as irregularities on the ground may engage one or the other shoe 21. Said coupling, as herein shown, includes a member 105 keyed to the inner end of the shaft 103 and having jaws 106, 106 projecting inwardly therefrom, which are adapted to engage recessed portions 107, 107 formed in the inner ends of the sleeve 84 of the star wheel 83. Thus, the feeding mechanism may be operated from one side of the conveyer by the hand lever 70 on the shaft 59, or from the opposite side of the conveyer by means of a similar hand lever 70 on the outer end of the shaft 103, and a certain amount of flexibility is provided in the connection between said shafts and feeding mechanisms to avoid binding between the extensible trough section and the gripping devices on opposite sides thereof.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding mechanism for shaker conveyers and in combination with an extensible trough section, a connecting frame reciprocably driven by the conveyer, a carrier member, gripping means carried by said carrier member, a linkage connection between the lower end of said carrier member and said frame, another linkage connection between the upper end of said carrier member and said frame, said linkage connections being relatively movable with respect to said frame, stopping means on said frame, and means selectively operable to hold either one or both of said linkage connections in engagement with said stopping means, to cause said linkage connection, held in engagement with said stopping means, to bodily move with said frame and exert a force on said carrier member to cause said gripping means to extensibly or retractibly move said extensible trough section with respect to the conveyer, or to move said trough section with the conveyer.

2. In a feeding means for shaker conveyers and in combination with an extensible trough section, a connecting frame reciprocably driven by the conveyer, a carrier member, gripping means carried by said carrier member, a link connecting the lower end of said carrier member with said frame, a rocking arm transversely pivoted on said frame, a link connecting the upper end of said carrier member with said rocking arm, said links being relatively movable with respect to said frame, stopping means on said frame, and means selectively operable to hold either said first mentioned link or said rocking arm or said link and rocking arm in engagement with said stopping means, to cause said linkage connection, held in engagement with said stopping means, to bodily move with said frame and exert a force on said carrier member, to extensibly or retractibly move said extensible trough section with respect to the conveyer, including a pair of spaced cams, one of which is engageable with said first mentioned link and the other of which is engageable with said rocking arm.

3. In a feeding means for shaker conveyers and in combination with an extensible trough section, a connecting frame reciprocably driven by the conveyer, a carrier member, gripping means carried by said carrier member, a link connecting the lower end of said carrier member with said frame, another link connecting the upper end of said carrier member with said frame, said links being relatively movable with respect to said frame, the connection from said second mentioned link to said frame including an upright rocking arm pivotally connected to said frame intermediate its ends, and means for holding either one or both of said links from movement with respect to said frame in the directions of movement of the conveyer, to cause said links to exert forces on said carrier members during certain strokes of the conveyer to cause gripping and release of said gripping means during opposite strokes of the conveyer including a stop on said frame and means manually operable to selectively hold said first mentioned link and said lever arm in engagement with said stop.

4. In a feeding means for shaker conveyers and in combination with an extensible trough section, a connecting frame reciprocably driven by the conveyer, a carrier member, gripping means carried by said carrier member, a link connecting the lower end of said carrier member with said frame, another link connecting the upper end of said carrier member with said frame, said links being relatively movable with respect to said frame, the connection from said second mentioned link to said frame including a lever arm pivotally connected to said frame intermediate its ends, and means for holding either one or both of said links from movement with respect to said frame in the directions of movement of the conveyer, to cause said links to exert forces on said carrier members during certain strokes of the conveyer which will alternately grip and release said gripping means including a stop on said frame and means selectively operable to independently hold said first mentioned link and said lever arm in engagement with said stop including a pair of spaced cams, one of which is operable to engage said link and the other of which is operable to engage said lever arm, said cams being arranged to simultaneously engage said link and lever arm and to be disengaged from one while in engagement with the other.

5. In a feeding means for shaker conveyers, a reciprocating trough section, an extensible trough section, a connecting frame pivotally connected with and reciprocated by said reciprocating trough section, a carrier member, gripping means carried by said carrier member and adapted to have gripping engagement with said extensible trough section, a yieldable link pivotally connecting one end of said carrier member with said frame, another link pivotally connected to the other end of said carrier member, a rocking arm transversely pivoted to said connecting frame and pivotally connecting said other link thereto, said links being relatively movable with respect to said frame, and means selectively operable to hold either one or both of said links from movement with respect to said frame in the directions of movement of the conveyer including stopping means on said frame and means for engaging said lever arm and yieldable link with said stopping means.

6. In a feeding means for shaker conveyers, a reciprocating trough section, an extensible trough section, a connecting frame connected with and reciprocated by said reciprocating trough section, a carrier member, gripping means carried by said carrier member and adapted to have gripping engagement with said extensible trough section, a yieldable link pivotally connecting one end of said carrier member with said frame and another link pivotally connected to the other end of said carrier member, a lever arm transversely pivoted to said frame and pivotally connecting said second mentioned link thereto, said links being relatively movable with respect to said frame, and means selectively operable to hold said links from movement with respect to said frame in the directions of movement of the conveyer including stopping means on said frame and a pair of cams for holding said lever arm and yieldable link in engagement with said stopping means.

7. In a shaker conveyer, a reciprocating trough section, an extensible trough section, and means for effecting extensible or retractible movement of said reciprocating trough section with respect to said extensible trough section including a connecting frame transversely pivoted to said reciprocating trough section and disposed in advance thereof, a carrier member having a pair of friction grip blocks carried thereby and adapted to engage said extensible trough section above and below a portion thereof, a connection from said frame to one end of said carrier member, to exert a thrusting action thereon including a yieldable link mounted on said frame for relative movement with respect thereto, and a manually controllable cam for holding said link from movement, a connection from the opposite end of said carrier member to said frame to exert a pulling action thereon including a link and a lever connected thereto and transversely pivoted to said frame, and a manually controllable cam, for holding said link from movement relative to said frame.

8. In a shaker conveyer, a reciprocating trough section, an extensible trough section, and means for effecting extensible or retractible movement of said reciprocating trough section with respect to said extensible trough section including a connecting frame transversely pivoted to said reciprocating trough section and extending in advance thereof, an inclined carrier member having a pair of friction grip blocks carried thereby, adapted to engage said extensible trough section above and below a portion thereof, a yieldable link having pivotal connection with the lower end of said carrier member and adapted to exert a thrusting force thereon during the forward strokes of the conveyer, a pair of parallel spaced transversely pivoted links connecting said yieldable link with said frame and permitting movement of said link relative to said frame, and means for holding said link from bodily movement with respect to said frame and for causing said link to exert a thrusting action on said carrier member during the forward strokes of the conveyer including a stop on said frame and means selectively operable for engaging said link with said stop and holding it in engagement therewith.

9. In a shaker conveyer, a reciprocating trough section, an extensible trough section, and means for effecting extensible or retractible movement of said reciprocating trough section with respect to said extensible trough section including a connecting frame transversely pivoted to said reciprocating trough section and extending in advance thereof, an inclined carrier member having a pair of friction grip blocks carried thereby adapted to engage said extensible trough section above and below a portion thereof, a yieldable link having pivotal connection with the lower end of said carrier member and adapted to exert a thrusting force thereon during the forward strokes of the conveyer, to engage said grip blocks with said extensible trough section during the forward strokes of the conveyer, a pair of parallel spaced transversely pivoted links connecting said yieldable link with said frame and permitting movement of said link relative to said frame, a link having pivotal connection with the opposite end of said carrier member and adapted to exert a pulling force thereon during the return strokes of the conveyer, to engage said grip blocks with said extensible trough section during the return strokes of the conveyer, a lever arm pivotally connecting said link with said frame, and a yieldable member connected between said lever arm and one of said parallel links, for urging said links in a position to engage said grip blocks with said extensible trough section upon the beginning of the forward or return strokes of the conveyer depending upon the direction of movement of said extensible trough section with respect to said reciprocating trough section.

10. In a shaker conveyer, a reciprocating trough section, an extensible trough section, and means for effecting extensible or retractible movement of said reciprocating trough section with respect to said extensible trough section including a pair of laterally spaced connecting frames extending in advance of said reciprocating trough section and transversely pivoted thereto for independent pivotal movement with respect thereto, a pair of carrier members, friction gripping means carried by said carrier members and adapted to have gripping engagement with said extensible trough section during alternate strokes of the conveyer, connections from opposite ends of said carrier members to said frames, and means for causing either one of said connections to exert forces on said carrier members to cause said carrier members to engage said grip blocks with said extensible trough section during certain strokes of the conveyer and to disengage said grip blocks from said extensible trough section during certain other strokes of the conveyer including a transverse shaft mounted in one of said frames, a transverse shaft mounted in said other frame and a flexible coupling connecting said shafts together.

11. In a shaker conveyer, a reciprocating trough section, an extensible trough section, and means for effecting extensible or retractible movement of said reciprocating trough section with respect to said extensible trough section including a pair of laterally spaced connecting frames extending in advance of said reciprocating trough section and transversely pivoted thereto for independent pivotal movement with respect thereto, a pair of carrier members, friction gripping means carried by said carrier members and adapted to have gripping engagement with said extensible trough section during alternate strokes of the conveyer, each of said carrier members being connected with one of said frames and the connection between each carrier member and each frame including a yieldable link connecting one end of one carrier member with one of said frames, a link connecting the opposite end of said carrier member with said frame, said links being relatively movable with respect to said frames, and means for holding said links from movement with respect to said frames to cause them to exert a pushing or pulling force on said carrier members including a transverse shaft on each of said frames, cam means on each of said shafts and having engagement with said links and a universal coupling connecting said shafts together.

12. In a feeding means for shaker conveyers, a reciprocating trough section, an extensible trough section, and means for moving said extensible trough section relative to said reciprocating trough section including a pair of laterally spaced supporting shoes extending in advance of said reciprocating trough section and transversely pivoted thereto for independent pivotal movement, a carrier member on each side of the conveyer and having gripping means carried thereby adapted to have gripping engagement with said extensible trough section, linkage connections between said carrier members and said shoes, for holding said carrier members in position to engage said gripping means with said extensible trough section during certain strokes of the conveyer, and means selectively operable to position said linkage connections to cause said gripping means to extend or retract said extensible trough section with respect to said reciprocating trough section including a transverse shaft journaled in one of said shoes and having controlling connection with the carrier member and linkage connection associated therewith, a transverse shaft journaled in said other shoe and having controlling connection with the carrier member and linkage connection associated therewith, and a flexible connection between said shafts to permit relative movement of one shoe with respect to the other.

WILLIAM W. SLOANE.